(12) United States Patent
Lee et al.

(10) Patent No.: US 10,692,631 B2
(45) Date of Patent: Jun. 23, 2020

(54) CRYOGENIC COOLING APPARATUS AND CONNECTING STRUCTURE FOR SUPERCONDUCTING DEVICE

(71) Applicant: LS Cable & System LTD., Anyang-si, Gyeonggi-do (KR)

(72) Inventors: Seok Ju Lee, Suwon-si (KR); Han Joong Kim, Seoul (KR); Chang Yeol Choi, Ansan-si (KR); Heo Gyung Sung, Suwon-si (KR); Jin Bae Na, Seoul (KR)

(73) Assignee: LS CABLE & SYSTEM LTD., Anyang-si, Gyeonggi-Do (KR)

( * ) Notice: Subject to any disclaimer, the term of this patent is extended or adjusted under 35 U.S.C. 154(b) by 480 days.

(21) Appl. No.: 15/526,035

(22) PCT Filed: Nov. 11, 2014

(86) PCT No.: PCT/KR2014/010806
§ 371 (c)(1),
(2) Date: May 11, 2017

(87) PCT Pub. No.: WO2016/076450
PCT Pub. Date: May 19, 2016

(65) Prior Publication Data
US 2017/0330653 A1    Nov. 16, 2017

(51) Int. Cl.
*H01B 12/16* (2006.01)
*F25B 9/00* (2006.01)
*F25D 19/00* (2006.01)

(52) U.S. Cl.
CPC .............. *H01B 12/16* (2013.01); *F25B 9/00* (2013.01); *F25D 19/006* (2013.01); *Y02E 40/647* (2013.01)

(58) Field of Classification Search
CPC ................................................ H01B 12/00–16
See application file for complete search history.

(56) References Cited

U.S. PATENT DOCUMENTS

| | | | |
|---|---|---|---|
| 6,334,313 B1* | 1/2002 | Nagaishi | F17C 13/007 62/51.1 |
| 2003/0183410 A1 | 10/2003 | Sinha et al. | |
| 2005/0257549 A1* | 11/2005 | Yamanaka | F25D 19/006 62/259.2 |

(Continued)

FOREIGN PATENT DOCUMENTS

| JP | 62-143230 U | 9/1987 |
|---|---|---|
| JP | 2002-164288 A | 6/2002 |

(Continued)

OTHER PUBLICATIONS

International Search Report for PCT/KR2014/010806 dated Jul. 22, 2015 from Korean Intellectual Property Office.

(Continued)

*Primary Examiner* — Colleen P Dunn
(74) *Attorney, Agent, or Firm* — K&L Gates LLP

(57) ABSTRACT

The present invention relates to a cryogenic cooling apparatus capable of stably maintaining a cryogenic condition by repairing or exchanging a sensor such as a temperature sensor of the cryogenic cooling apparatus without releasing vacuum states of the cryogenic cooling apparatus and a system connected thereto, when the sensor needs to be repaired or exchanged.

20 Claims, 7 Drawing Sheets

(56) References Cited

U.S. PATENT DOCUMENTS

2013/0004808 A1  1/2013  Tschismar
2014/0298827 A1* 10/2014  Sung ..................... H01R 4/68
                                              62/49.2

FOREIGN PATENT DOCUMENTS

JP         3509092 B2    3/2004
KR   10-2012-0104287 A   9/2012
WO      WO 02/25672 A2   3/2002

OTHER PUBLICATIONS

Extended European Search Report dated Nov. 7, 2018 in corresponding EP Patent Application No. 14905700.0.

* cited by examiner

CRYOGENIC COOLING APPARATUS AND CONNECTING STRUCTURE FOR SUPERCONDUCTING DEVICE

CROSS REFERENCE TO PRIOR APPLICATION

This application is a National Stage Patent Application of PCT International Patent Application No. PCT/KR2014/010806 (filed on Nov. 11, 2014) under 35 U.S.C. § 371, which is hereby incorporated by reference in its entirety.

TECHNICAL FIELD

The present invention relates to a cryogenic cooling apparatus and a connecting structure for a superconducting device.

BACKGROUND ART

Cryogenic cooling technology includes power transmission technology, medical technology, basic nuclear fusion technology, satellite-related technology, etc. using a superconductor, and has been extensively applied and developed in various fields.

In a representative cryogenic cooling method, a cooling part which performs cooling using a refrigerant such as circulating liquid nitrogen is provided at an outer side of a refrigerant container accommodating an object to be cooled, and a vacuum insulation part be provided at an outer side of the cooling part for vacuum insulation.

In this method, the object may be cooled using the refrigerant cooled to extremely low temperature, and be maintained in a cryogenic state by blocking the transfer of heat through the vacuum insulation part.

For such cryogenic cooling, a cooling condition should be maintained constant. For example, when a superconductivity condition is maintained, an electric resistance of a superconductor approaches zero and the superconductor thus has high current transfer capability even at a low voltage. However, when a cryogenic condition is canceled, the electric resistance of the superconductor sharply increases and thus normal power transmission cannot be conducted and a safety accident may occur.

Thus, in a cryogenic cooling apparatus, a cryogenic state of an object to be cooled should be stably maintained. Furthermore, whether the cryogenic state of the object is stably maintained as intended should be continuously monitored.

Thus, the cryogenic cooling apparatus may include a temperature sensor to measure temperature of the object to be cooled.

The temperature of the object to be cooled may be directly measured using the temperature sensor but the temperature of a liquid refrigerant may be directly measured using the temperature sensor. However, in many cases, the temperature sensor may be difficult to be installed at an object to be cooled or a refrigerant. Furthermore, thermal invasion through a wire used for electrical connection of a cooling sensor or the like may occur.

To solve this problem, the temperature sensor may be installed on a surface of a refrigerant container forming the cooling part, and temperature of the surface of the refrigerant container may be measured to estimate temperature of the refrigerant and determine temperature of the object to be cooled.

In this case, when the temperature sensor malfunctions or the life thereof ends, it is inevitable that a vacuum state between the refrigerant container of the cooling part and a vacuum container of the vacuum insulation part should be released to repair or exchange the temperature sensor.

The releasing of the vacuum state to repair or exchange the temperature sensor of the cryogenic cooling apparatus means that a vacuum state of an entire object to be cooled by the cryogenic cooling apparatus is released. After the exchange of the temperature sensor, the amount of time and efforts required to vacuuimize all the cryogenic cooling apparatus and a system connected thereto again are proportional to the size or scale of the system connected to the cryogenic cooling apparatus.

DETAILED DESCRIPTION OF THE INVENTION

Technical Problem

The present invention is directed to a cryogenic cooling apparatus capable of stably maintaining a cryogenic condition by repairing or exchanging a sensor such as a temperature sensor of the cryogenic cooling apparatus without releasing vacuum states of the cryogenic cooling apparatus and a system connected thereto, when the sensor needs to be repaired or exchanged.

As a concrete example, the present invention is directed to a connecting structure for a superconducting device serving as a cryogenic cooling apparatus, which is capable of stably maintaining an cryogenic condition by quickly separating and installing a sensor included in the connecting structure for a superconducting device connected to a superconducting cable for maintenance by releasing a vacuum state of only a region of the connecting structure other than the whole connecting structure.

The present invention is also directed to a connecting structure for a superconducting device serving as a cryogenic cooling apparatus, which is capable of preventing external air, moisture, etc. from flowing into a region of the connecting structure when a vacuum state of the region of the connecting structure is released for maintenance of a sensor.

Technical Solution

According to an aspect of the present invention, there is provided a cryogenic cooling apparatus comprising: a cooling part configured to cool an object to be cooled, the cooling part provided outside the object, and including a refrigerant container for containing a circulating liquid refrigerant; a vacuum insulation part provided on an outer side of the cooling part, and including a vacuumized vacuum container to vacuum insulate the cooling part; a sensor provided on a surface of the refrigerant container of the cooling part; a sensor port extending to a surface of the refrigerant container having the sensor while passing through the vacuum container, the sensor port being shielded from the vacuum insulation part; and a purge port configured to supply an inert gas into the sensor port or apply sound pressure into the sensor port, the purge port being provided outside the vacuum container.

And the sensor may be detachably installed on the refrigerant container, and the sensor port may comprise a pipe part extending from the refrigerant container toward the vacuum container, and having one end configured to communicate with the outside while passing through the vacuum container; and a cover configured to air-tightly block one end part of the pipe part.

And the sensor may be detachably fastened into an installation part, the installation part being installed on a surface of the refrigerant container.

And at least one section of the pipe part may have a corrugate tube structure.

And the cryogenic cooling apparatus may further comprise a connection pipe configured to connect the sensor port and the purge port, the connection pipe being coupled to the sensor port at a position closer to the refrigerant container than the vacuum container to communicate with the sensor port.

And the purge port may comprise a valve configured to selectively block the connection pipe.

And when a vacuum state of the inside of the sensor port is released, the inert gas may be supplied into the sensor port via the purge port.

And when the inside of the sensor port is formed in the vacuum state, the sound pressure may be applied into the sensor port via the purge port.

And the vacuum insulation part may be divided into a plurality of parts, and wherein the sensor may be provided in each of the parts of the vacuum insulation part.

And the sensor port and the purge port coupled to the sensor port may be provided in each of the parts of the vacuum insulation part, and wherein the sensor may be installed at a side of the refrigerant container inside the sensor port provided in each of the parts of the vacuum insulation part.

And according to an aspect of the present invention, there is provided a connecting structure for a superconducting device, comprising: a refrigerant container having an open upper part, the refrigerant container including at a lower part thereof a cryogenic part configured to contain a liquid refrigerant, and a temperature gradient part provided above the cryogenic part and configured to contain a gaseous refrigerant, wherein the gaseous refrigerant has a temperature gradient; a vacuum container configured to cover the refrigerant container so as to vacuum insulate the vacuum container; a sensor port provided on the refrigerant container while passing through the vacuum container, the sensor port including at least one sensor detachably provided to sense temperature of the refrigerant container or temperature of a refrigerant contained in the refrigerant container; a purge port configured to supply an inert gas into the sensor port or apply sound pressure into the sensor port, the purge port being provided on an outer wall of the vacuum container; a room-temperature part tubular body configured to contain insulating oil or an insulating gas, the room-temperature part tubular body forming a room-temperature part and being separated from the refrigerant container; a sealing member configured to seal the open upper part of the refrigerant container to separate the temperature gradient part from the room-temperature part; and a conductor wire coupled to a superconducting conductor layer of a superconducting cable in the liquid refrigerant contained in the refrigerant container, the conductor wire extending to the room-temperature part tubular body while passing through the sealing member.

And an installation part may be provided on at least a part of the refrigerant container, wherein the sensor is detachably installed in the installation part.

And the sensor port may comprise a pipe part extending from the refrigerant container toward the vacuum container, and having one end configured to communicate with the outside while passing through the vacuum container; and a cover configured to air-tightly block one end part of the pipe part.

And the pipe member may comprise a heat conduction prevention means on at least a part thereof, the heat conduction prevention means being configured to increase a heat conduction path between the refrigerant container and the vacuum container.

And the heat conduction prevention means may comprise a convex-concavo part or a corrugate tube provided on the at least the part of the pipe part.

And a signal terminal may be installed at the cover, the signal terminal being electrically connected to a cable extending from the sensor.

And the connecting structure for a superconducting device may further comprise a connection pipe configured to connect the sensor port and the purge port.

And the connection pipe may be coupled to the sensor port to be adjacent to the refrigerant container.

And the connecting structure for a superconducting device may further comprise a valve configured to selectively block the connection pipe, the valve being provided at a predetermined position on the connection pipe outside the vacuum container.

And the inert gas may be supplied into the sensor port through the purge port and the connection pipe when a vacuum state of the inside of the sensor port is released, and the sound pressure may be applied into the sensor port through the purge port when the inside of the sensor port is formed in the vacuum state.

And according to an aspect of the present invention, there is provided a method of installing a sensor of a connecting structure for a superconducting device including a refrigerant container configured to contain a refrigerant, a vacuum container configured to cover the refrigerant container so as to vacuum insulate the refrigerant container, a sensor port provided on the refrigerant container while passing through the vacuum container and having a cover provided at one end thereof and a sensor detachably installed to sense temperature of the refrigerant, and a purge port provided on an outer wall of the vacuum container and coupled to the sensor port, the method comprising: supplying an inert gas into the sensor port through the purge port; releasing a vacuum state of the inside of the sensor port by separating the cover; separating the sensor from the inside of the sensor port, and installing the sensor in the sensor port; and applying sound pressure into the sensor port through the purge port.

Advantageous Effects

According to the present invention, when a sensor such as a temperature sensor is included in a cryogenic cooling apparatus and a connecting structure for a superconducting device which is an example of a cryogenic cooling apparatus, an additional sensor port separated from a space between a refrigerant container of a cooling part and a vacuum container of a vacuum insulation part and providing an installation space for the sensor is provided to easily separate and install the sensor within a short time period. That is, the sensor may be easily and quickly separated and installed by simply releasing a vacuum state of only the sensor port without releasing a vacuum state of a whole system including the cryogenic cooling apparatus, the connecting structure for a superconducting device which is an example of the cryogenic cooling apparatus, and a superconducting cable.

The cryogenic cooling apparatus and the connecting structure for a superconducting device which is an example of the cryogenic cooling apparatus according to the present invention includes not only the sensor port but also a purge port configured to selectively provide an inert gas and sound pressure into the sensor port. Thus, external air and moisture may be prevented from flowing into the sensor port by supplying an inert gas into the sensor port via the purge port before a vacuum state of the inside of the sensor port is released for maintenance. Furthermore, in order to vacuumize the inside of the sensor port after the installation of the sensor, the inside of the sensor port may be quickly and easily vacuumized by applying sound pressure into the sensor port via the purge port.

Furthermore, when the cryogenic cooling apparatus and the connecting structure for a superconducting device which is an example of the cryogenic cooling apparatus according to the present invention are configured, a heat conduction prevention means such as a corrugate tube may be provided on a pipe part of the sensor port to increase a heat conduction path and thus the transfer of heat to the refrigerant container of the cooling part from the outside of the vacuum container of the vacuum insulation part via a sensing port unit may be prevented as much as possible. Thus, a superconductivity condition of the superconducting cable may be maintained.

In addition, when temperature information obtained by the sensor is transmitted via wire, the temperature information may be transmitted to the outside by installing a signal terminal at a cover tightly blocking the sensor port and connecting a cable of the sensor to the signal terminal. In this case, additional devices are not needed to transmit the temperature information and thus the structure of the sensor port may be simplified, thereby decreasing the amount of time and costs required to assemble and manufacture the sensor port.

BEST MODE

Figure 1:
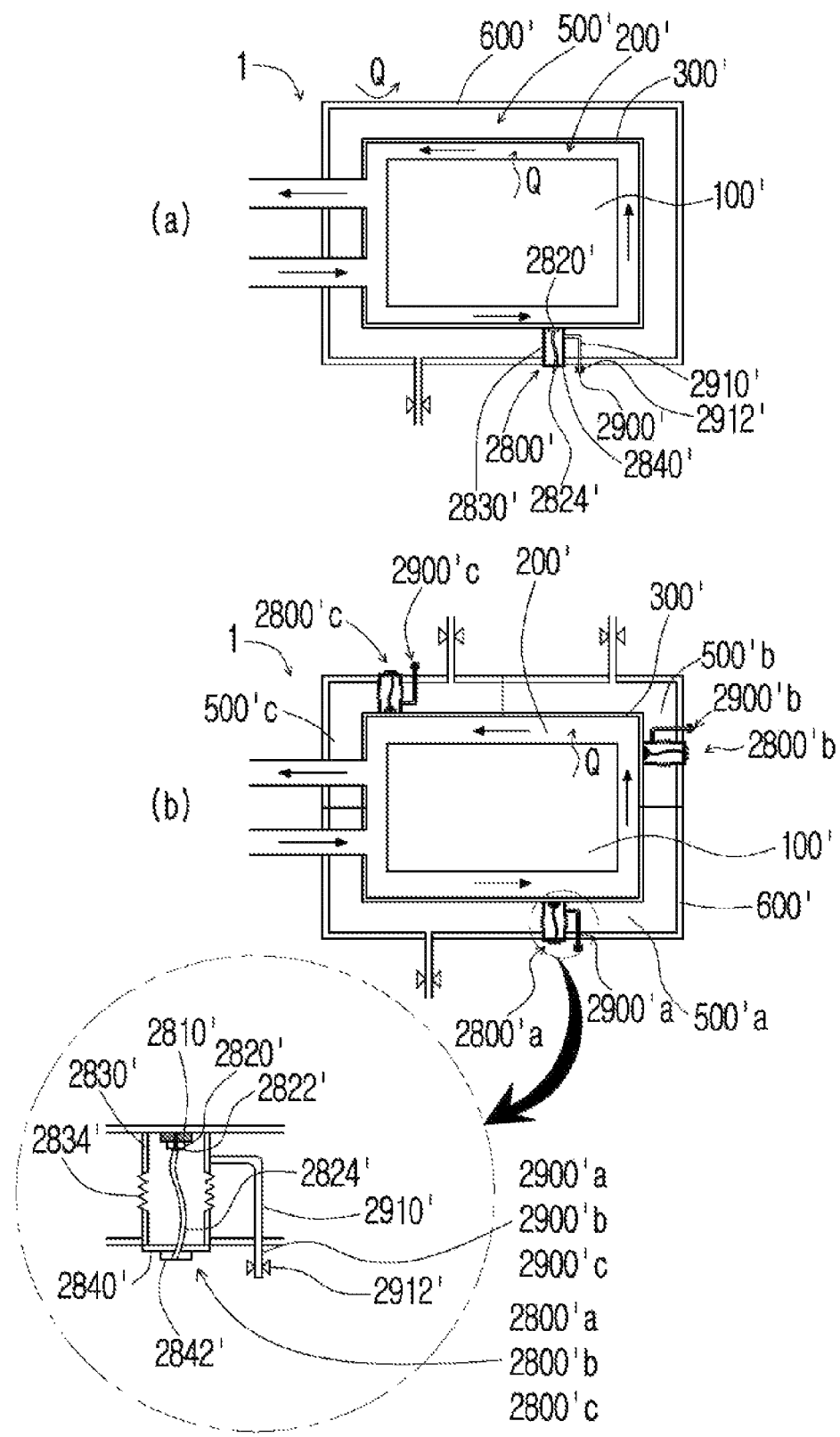
FIG. 1 is a diagram illustrating a structure of a cryogenic cooling apparatus according to an embodiment of the present invention.

Hereinafter, exemplary embodiments of the present invention will be described in detail with reference to the accompanying drawings. The present invention is not, however, embodied to these embodiments and may be embodied in many different forms. Rather, these embodiments are provided so that this disclosure will be thorough and complete and will fully convey the concept of the invention to those of ordinary skill in the art. The same reference numerals represent the same elements throughout the specification FIG. 1 is a diagram illustrating a structure of a cryogenic cooling apparatus according to the present invention.

A cryogenic cooling apparatus 1' according to the present invention includes a cooling part 200' in which an object 100' to be cooled is arranged at a center part to cool the object 100' by using a refrigerant outside the object 100', and a vacuum insulation part 500' for vacuum insulating the cooling part 200'.

The object 100' may be, for example, a core part of a superconducting cable having a superconductor. The superconducting cable will be described in detail with reference to FIG. 2 below.

The cryogenic cooling apparatus 1' of FIG. 1 according to the present invention may be applied variously to the object 100' to be cooled to extremely low temperature.

The cryogenic cooling apparatus 1' according to the present invention may include the cooling part 200' which cools the object 100' to extremely low temperature by circulating a liquid refrigerant, and the vacuum insulation part 500' covering the cooling part 200' to vacuum-insulate the cooling part 200', and may further include at least one sensor 2820' such as a temperature sensor to sense temperature of the object 100'.

The cooling part 200' may include a refrigerant channel through which a liquid refrigerant cooled outside the cryogenic cooling apparatus 1' is supplied, exchanges heat with the object 100', is discharged out of the cooling apparatus 1', is cooled again, and is then supplied to the cooling apparatus 1'.

In detail, the cryogenic cooling apparatus 1' according to the present invention may include the cooling part 200' provided outside the object 100', including a refrigerant container 300' containing a circulating liquid refrigerant, and configured to cool the object 100'; the vacuum insulation part 500' provided at an outer side of the cooling part 200' and including a vacuum container 600' to vacuum insulate the cooling part 200'; the sensor 2820' installed on a surface of the refrigerant container 300' of the cooling part 200'; a sensor port 2800' extending to the refrigerant container 300' having the sensor 2820' while passing through the vacuum container 600', and shielded from the vacuum insulation part 500'; and a purge port 2900' provided outside the vacuum container 600' and configured to providing an inert gas or sound pressure into the sensor port 2800'.

The sensor 2820' of the cryogenic cooling apparatus 1' according to the present invention may be a temperature sensor for indirectly measuring the temperature of the object 100'.

In order to directly install the sensor 2820' at the object 100' and transmit information sensed by the sensor 2820' to a controller of an external device, the sensor 2820' should pass through the cooling part 200' through which a refrigerant flows and thus airtightness is lowered. Thus, the sensor 2820' may be installed at a side of the refrigerant container 300' of the cooling part 200'.

The refrigerant container 300' is formed of a metal material. Thus, temperature of a refrigerant, and more particularly, the temperature of the object 100' may be determined on the basis of temperature of the sensor 2820' installed at the refrigerant container 300'.

The cryogenic cooling apparatus 1' according to the present invention further includes the sensor port 2800' for installing the sensor 2820' so that a vacuum state of the whole vacuum insulation part 500' of the cryogenic cooling apparatus 1' may not be destroyed when maintenance is performed on the sensor 2820'.

A region of the sensor port 2800' in which the sensor 2820' is installed may be divided into ultra-fine parts. Thus, when the sensor 2820' is exchanged or repaired through a separately set vacuum region, the sensor 2820' may be maintained by releasing only a vacuum state of the sensor port 2800'. Accordingly, the whole vacuum insulation part 500' may not be influenced by the maintenance of the sensor 2820'.

Alternatively, the cryogenic cooling apparatus 1' according to the present invention may include a plurality of vacuum insulation parts 500'.

That is, in the embodiment of FIG. 1(*a*), the cryogenic cooling apparatus 1' includes one vacuum insulation part 500'. In the embodiment of FIG. 1(*b*), a vacuum insulation part 500' of the cryogenic cooling apparatus 1 includes a first vacuum insulation part 500a', a second vacuum insulation part 500b', and a third vacuum insulation part 500c'.

If the vacuum insulation part 500' configured to vacuum insulate the cooling part 200' having a cryogenic state of the cryogenic cooling apparatus 1' is divided into a plurality of parts, a vacuum state of only a specific part of the vacuum insulation part 500' may be released even when the vacuum container 600' of the cryogenic cooling apparatus 1' or the sensor port 2800' is damaged. Thus, a vacuum state of the whole system may be prevented from being broken and the amount of a time required to repair the system may be greatly decreased.

In a general operating mode, the sensor port 2800' of the cryogenic cooling apparatus 1' according to the present invention should be also maintained in the vacuum state. However, the vacuum state of the sensor port 2800' is released when the sensor 2820' is exchanged with another sensor.

In this case, the refrigerant container 300' is in a cryogenic state, and the sensor 2820' installed on the refrigerant container 300' may be seriously frosted over as soon as the vacuum state of the sensor port 2800' is released. A temperature sensor is difficult to be separated or exchanged due to the frost. There is a need for suppressing formation of frost by blocking external humid air simultaneously with releasing the vacuums state of the sensor port 2800'. Thus, the purge port 2900' may be provided on an external wall of the vacuum container 600', so that an inert gas may be supplied into the sensor port 2800' when the vacuum state of the sensor port 2800' is released or sound pressure may be applied into the sensor port 2800' when the sensor port 2800' needs to be vacuumized.

To easily achieve the purpose, a connection pipe 2910' may be provided to connect the sensor port 2800' and the purge port 2900'. The connection pipe 2910' may be coupled to the sensor port 2800' at a position closer to the refrigerant container 300' than the vacuum container 600' to communicate with the sensor port 2800'.

That is, the connection pipe 2910' is provided to most effectively supply an inert gas or the like emitted via the purge port 2900' to the sensor 2820' when the vacuum state of the sensor port 2800' is released.

When the vacuum insulation part 500' is divided into the parts as illustrated in FIG. 1(*b*), sensors 2800a', 2800b', and 2800c' may be respectively provided inside the vacuum insulation parts 500a', 500b', and 500c', and the sensor port 2800' and the purge port 2900' may be provided for maintenance of the sensors 2800a', 2800b', and 2800c'.

In the embodiment of FIG. 1(*b*), the first vacuum insulation part 500a', the second vacuum insulation part 500b', and the third vacuum insulation part 500c' may respectively include the first sensor port 2800a', the second sensor port 280b', and the third sensor port 2800c', and a first purge port 2900a', a second purge port 290b', and a third purge port 2900c' connected to the sensor ports 2800a', 280b', and 2800c' via the connection pipe 2910' maybe provided.

The sensor 2820' of each of the cryogenic cooling apparatuses 1' illustrated in FIGS. 1(*a*) and (*b*) is detachably installed at the refrigerant container 300'. The sensor port 2800' may include a pipe part 2830' extending from the refrigerant container 300' toward the vacuum container 600' and having one end configured to communicate with the outside while passing through the vacuum container 600', and a cover 2840' configured to air-tightly block one end part of the pipe part 2830'.

As illustrated in FIG. 1(*a*), information sensed by the sensor 2820' may be received via a cable 2824' connected to the sensor 2820' by pulling out the cable 2824' to the outside via the sensor port 2800'.

As illustrated in FIG. 1(*b*), a signal terminal 2842' to which the cable 2824' extending from the sensor 2820' is electrically connected may be installed at the cover 2840'. That is, the signal terminal 2842' may be installed to pass through the cover 2840', the cable 2824' extending from the sensor 2820' may be electrically connected to one end of the signal terminal 2842', and an additional connector for sensing information may be installed at the signal terminal 2842'. Thus, as illustrated in FIG. 1(*a*), a cable may be installed not to be directly exposed, and connectivity to other peripheral devices may be improved.

The sensor 2820' may be directly attached to or installed on the refrigerant container 300' as illustrated in FIG. 1(*a*) but may be detachably fastened into an installation part 2810' installed on a surface of the refrigerant container 300' as illustrated in FIG. 1(*b*).

When the sensor 2820' includes a fastening hole for fastening the sensor 2820' using a fastening member such as a bolt 2822', the sensor 2820' maybe firmly fixed by being installed in the installation part 2810' formed of a metal material.

A region of the pipe member 2830' may have a structure of a corrugate tube 2834'. The corrugate tube 2834' may increase a heat transfer path of heat conduction, thereby minimizing heat conduction.

The purge port 2900' may include a valve 2912' configured to selectively block the connection pipe 2910' so that application of the inert gas or the vacuum pressure may be selectively controlled.

When the vacuum state of the inside of the sensor port 2800' is released through the purge port 2900', the inert gas may be supplied into the sensor port 2800' via the purge port 2900'. When the inside of the sensor port 2800' is formed to be in the vacuum state, the sound pressure may be applied into the sensor port 2800' via the purge port 2900'.

Figure 2:
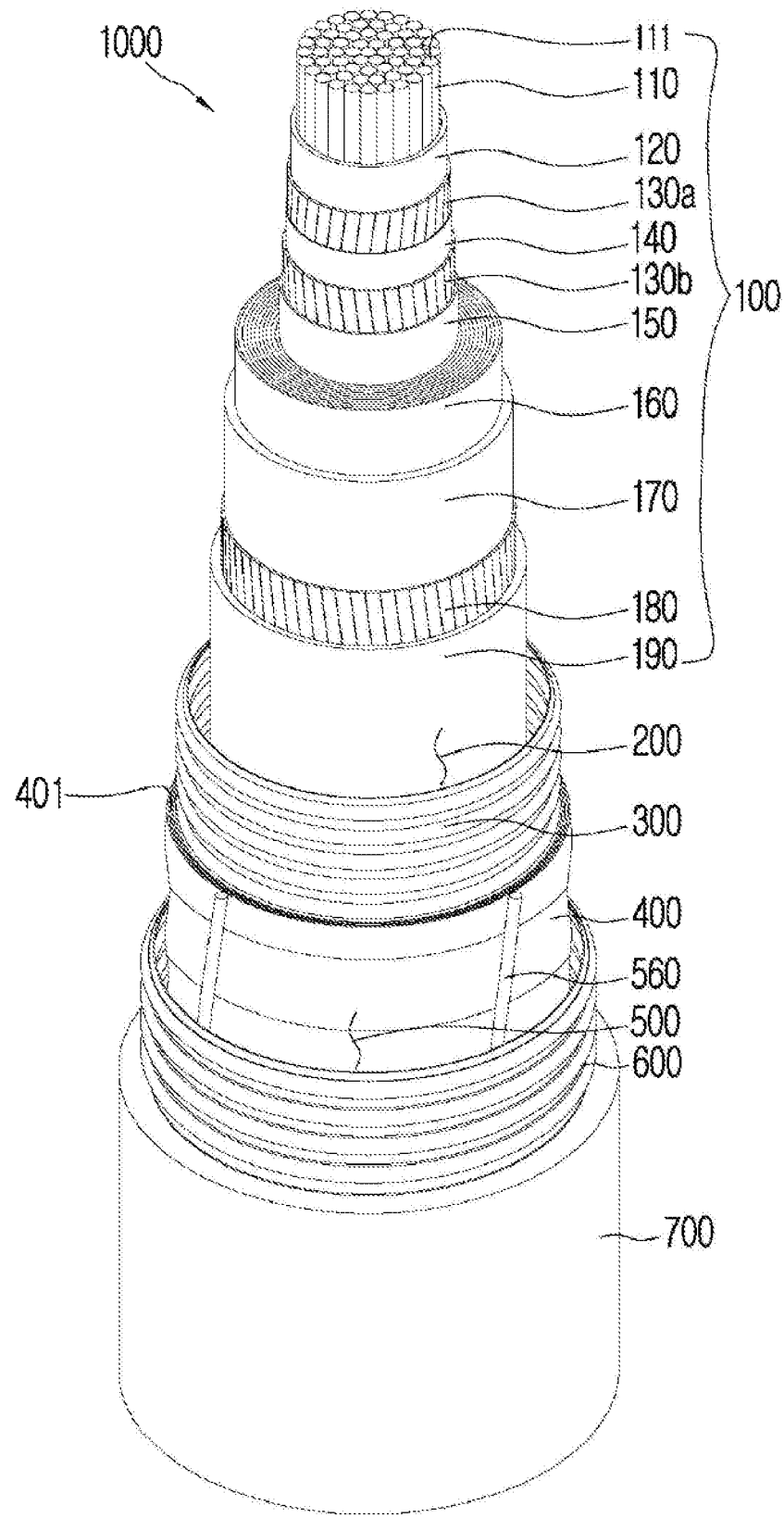
FIG. 2 is a partial cut-away perspective view of a superconducting cable cooled to extremely low temperature when connected to a connecting structure for a superconducting device which is an example of a cryogenic cooling apparatus, according to the present invention.
Figure 3:
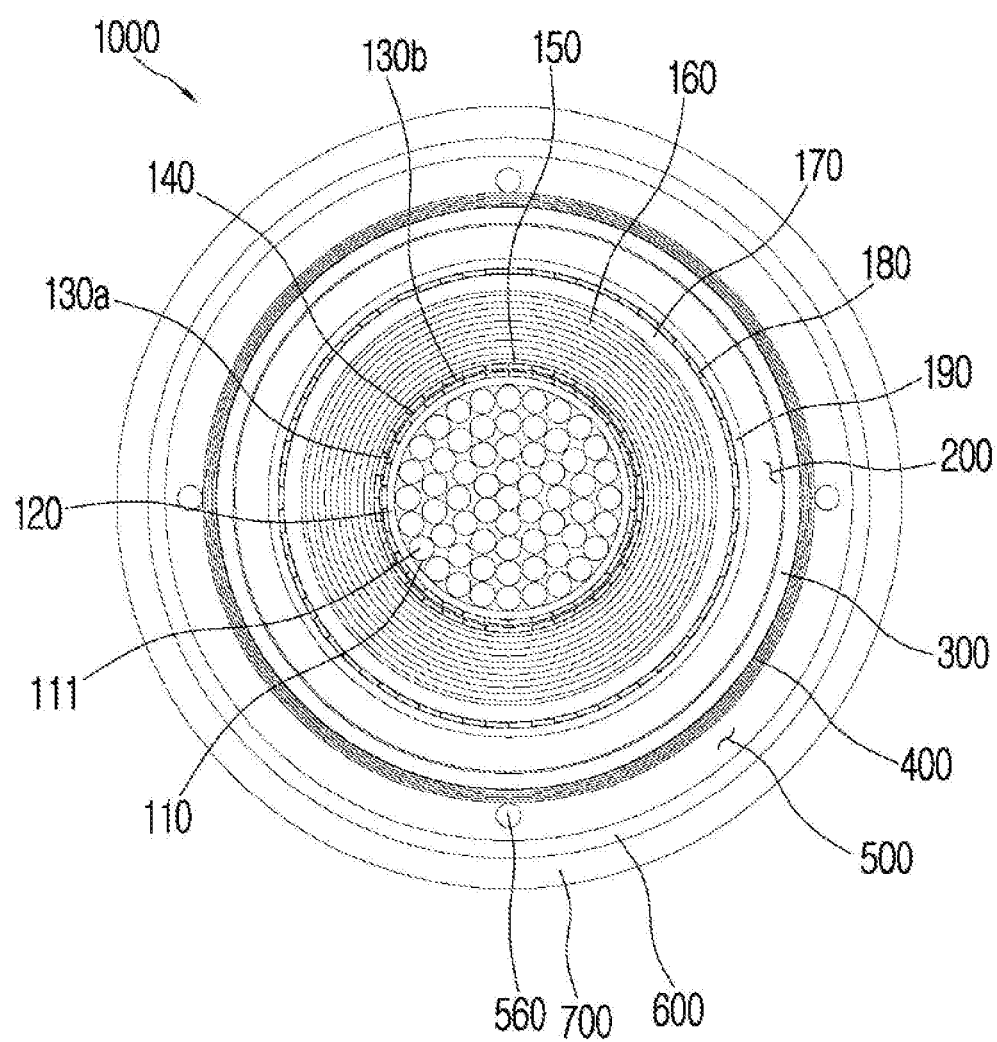
FIG. 3 is a cross-sectional view of FIG. 2.

FIG. 2 is a partial cut-away perspective view of a superconducting cable cooled to extremely low temperature when connected to a connecting structure for a superconducting device which is an example of a cryogenic cooling apparatus according to the present invention. FIG. 3 is a cross-sectional view of FIG. 2.

A superconducting cable 1000 includes a core part 100 including, in a direction from a center to an outer side, a former 110, at least two layer-superconducting conductor layer 130 having a plurality of superconductors arranged in parallel in a lengthwise direction of the former 10 to cover an outer side of the former 110, an insulating layer 140 covering the superconducting conductor layer 130, and at least two layer-superconducting shield layer 180 having a plurality of superconductors arranged in parallel in the lengthwise direction of the former 110 to cover an outer side of the insulating layer 140; a cooling part 200 provided at an outer side of the core part 100 to cool the core part 100 and including a refrigerant channel of a liquid refrigerant for cooling the core part 100; an inner metal conduit 300 provided at an outer side of the cooling part 200; an insulating part 400 provided at an outer side of the inner metal conduit 300 to form an insulating layer wound with an insulator 401 in multiple layers; a vacuum insulation part 500 having a plurality of spacers 560 arranged at spaced points on an outer side of the insulating part 400 to vacuum-insulate the cooling part 200; an outer metal conduit 600 provided at an outer side of the vacuum insulation part 500; and a sheath part 700 provided at an outer side of the outer metal conduit 600 to form a sheath layer.

The elements of the superconducting cable 1000 will be sequentially described below. The former 110 may provide a place for installing a flat and long superconductor around the former 110, serve as a frame for forming a desired shape, and be a path through which fault current flows. The former 110 may have a form in which a plurality of copper (Cu) wires 111 each having a round cross section are compressed into a round shape.

The former 110 may have an embossed surface since the copper (Cu) wires 111 each having the round cross section of the former 110 are compressed into a round shape and twisted together. Thus, a planarizing layer 120 may be coated on the outer side of the former 110 to planarize the embossed surface of the former 110. The planarizing layer 120 may be formed of a material such as semiconducting carbon paper or a brass tape.

A first superconducting conductor layer 130*a* may be provided at the outer side of the former 110 planarized by the planarizing layer 120 by winding a plurality of superconductors around the outer side of the former 110. The first superconducting conductor layer 130*a* may be installed such that the superconductors are arranged in parallel to be adjacent to each other to cover the perimeter of the planarizing layer 120. As illustrated in FIG. 2, the superconducting conductor layer 130 may be formed in multiple layers according to the intensity of current to be transmitted or supplied through the superconducting cable 1000.

In the embodiment of FIG. 2, a total of two superconducting conductor layers 130*a* and 13*b* are provided. When the superconducting conductor layers 130*a* and 13*b* are simply stacked, the intensity of current does not increase due to the skin effect of the current. To solve this problem, when the superconducting conductor layer 130 is formed in multiple layers, the insulating tape 140 may be interposed between the superconducting conductor layers 130*a* and 13*b*. The insulating layer 140 may be provided in the form of an insulating tape, and arranged between the stacked superconducting conductor layers 130*a* and 130*b* to insulate them from each other, thereby preventing the skin effect from occurring when superconductors are stacked.

In the embodiment of FIG. 2, the superconducting conductor layer 130 includes two layers, i.e., the first superconducting conductor layer 130*a* and the second superconducting conductor layer 13*b*, but may include more than two layers if needed.

Superconductors of each of the superconducting conductor layers 130*a* and 13*b* may be connected in parallel to the element wires of the former 110, so that current flowing through the superconductors may flow to the element wires of the former 110 when an accident such as destruction of the superconductivity condition occurs. According to this method, the superconductors maybe prevented from being heated or damaged, when the superconductivity condition is not satisfied and a resistance value of the superconductors thus increases.

An inner semiconducting layer 150 may be provided at an outer side of the second superconducting conductor layer 130*b* provided at an outer side of the first superconducting conductor layer 130*a*. The inner semiconducting layer 150 may be provided to relieve the concentration of an electric field in each of regions of the superconducting conductor layer 130 and to uniformize an electric field on a surface of the superconducting conductor layer 130. The inner superconducting layer 150 may be formed by rolling a superconducting tape.

An insulating layer 160 may be provided at an outer side of the inner semiconducting layer 150. The insulating layer 160 may be provided to increase the dielectric strength of the superconducting cable 1000. In general, a cross-linking polyethylene (XLPE) cable or an oil-filled cable is used to insulate a high-voltage cable. However, a superconducting cable is cooled to extremely low temperature for the superconductivity of superconductors thereof but XLPE may be damaged at the extremely low temperature, thereby causing dielectric breakdown to occur. The oil-filled cable may cause an environment problem to occur. Thus, in the superconducting cable 1000 according to the present invention, insulating paper which is a general paper material may be used as the insulating layer 160. The insulating layer 160 may be formed by rolling the insulating paper a plurality of times.

An outer semiconducting layer 170 may be provided at an outer side of the insulating layer 160. Similarly, the outer semiconducting layer 170 may be provided to relieve the concentration of an electric field in each of the regions of the superconducting conductor layer 130 and uniformize an electric field on a surface of the superconducting conductor layer 130. The outer semiconducting layer 170 may be also formed by rolling a semiconducting tape.

The superconducting shield layer 180 may be provided at an outer side of the outer semiconducting layer 170. A method of forming the superconducting shield layer 180 may be similar to the method of forming the superconducting conductor layer 130. When the outer semiconducting layer 170 has an uneven surface, a planarizing layer (not shown) may be provided if necessary. Superconductors may be arranged in parallel at an outer side of the planarizing layer in a circumferential direction to form the superconducting shield layer 180.

A core sheath layer 190 serving as a sheath of the core part 100 may be provided at an outer side of the superconducting shield layer 180. The core sheath layer 190 may include various tapes, binders, or the like, and serve as a sheath to expose the core part 100 via a cooling layer to be described below.

The core part 100 of the superconducting cable 1000 may be configured according to the method described above. Although FIGS. 2 and 3 illustrate that the planarizing layer and the semiconducting layer are each formed in a single layer using the same material, various additional layers may be added if necessary.

The cooling part 200 may be provided at the outer side of the core part 100. The cooling part 200 may be provided to cool the superconductors of the core part 100, and may include a liquid-refrigerant circulation channel therein. Liquid nitrogen may be used as the liquid refrigerant. The liquid refrigerant (liquid nitrogen) may be cooled to about −200° C. and circulate through the refrigerant channel to maintain extremely low temperature which is a superconductivity condition of the superconductors of the core part 100 inside the cooling part 200.

The refrigerant channel of the cooling part 200 may allow the liquid refrigerant to flow in one direction. The liquid refrigerant may be collected using a joint box of the superconducting cable 1000 or the like, and cooled and supplied again to the refrigerant channel of the cooling part 200.

The inner metal conduit 300 may be provided at the outer side of the cooling part 200. The inner metal conduit 300 may serve as a sheath of the superconducting cable 1000 to prevent the core part 100 from being mechanically damaged during installation and driving of the superconducting cable 1000, together with the outer metal conduit 600 to be described below. The superconducting cable 1000 is wound around a drum to be easily manufactured and transferred, and installed by being unwound from the drum. Accordingly, bending stress or tensile stress may be continuously applied to the superconducting cable 1000.

The inner metal conduit 300 may be provided to maintain the initial performance of the superconducting cable 1000 even when such mechanical stress is applied to the superconducting cable 1000. Thus, the inner metal conduit 300 may have a corrugated structure in which peaks and valleys are repeatedly formed in a lengthwise direction of the superconducting cable 1000 to reinforce the rigidity of the superconducting cable 1000 against mechanical stress. The inner metal conduit 300 may be formed of a material such as aluminum.

The inner metal conduit 300 is provided at the outer side of the cooling part 200 and may thus have extremely low temperature corresponding to the temperature of the liquid refrigerant. Thus, the inner metal conduit 300 may be classified as a low-temperature metal conduit.

Furthermore, the insulating part 400 having an insulating layer in which an insular coated with a thin polymer having low heat conductivity is wound in multiple layers around a metal film having high reflectance may be provided on an outer circumferential surface of the inner metal conduit 300. The insulating layer may form multi-layer insulation (MLI) and generally minimize the transfer of heat through radiation.

Accordingly, the exchange of heat or the invasion of heat through radiation may be prevented owing to the metal film having high reflectance.

The vacuum insulation part 500 may be provided at the outer side of the insulating part 400. The vacuum insulation part 500 maybe provided to minimize the transfer of heat toward the insulation layer through convection current or the like, caused when heat insulation is not sufficiently conducted by the insulating part 400.

The vacuum insulation part 500 may be obtained by forming a separate space at the outer side of the insulating part 400 and making the separate space to be in the vacuum state.

The vacuum insulation part 500 may include at least one spacer 560 to form a physically separate space for blocking the invasion of heat to the core part 100 from the outside which is at room temperature through convection current or the like. At least two spacers 560 may be provided in the separate space to prevent the outer metal conduit 600 provided at an outer side of the separate space in the vacuum insulation part 500 and the insulating part 400 provided at an inner side of the vacuum insulation part 500 from being in contact with each other in all the regions of the superconducting cable 1000. The spacers 560 may be arranged in the lengthwise direction of the superconducting cable 1000, and be wound to spirally cover the outer side of the core part 100, and particularly, the insulating part 400.

As illustrated in FIG. 2, a plurality of spacers 560 may be provided. The number of the spacers 560 may be increased or decreased according to the type or size of the superconducting cable 1000. The superconducting cable 1000 according to the present invention may include three to five spacers 560.

The outer metal conduit 600 may be provided at an outer side of the vacuum insulation part 500 having the spacers 560. The shape and material of the outer metal conduit 600 may be the same as those of the inner metal conduit 300. The outer metal conduit 600 may have a larger diameter than that of the inner metal conduit 300 so that the separate space may be formed using the spacers 560.

The sheath part 700 serving as a sheath protecting the inside of the superconducting cable 1000 may be provided at the outer side of the outer metal conduit 600. The sheath part 700 may be formed of a sheath material used to form as a sheath part of a general power cable.

Figure 4:
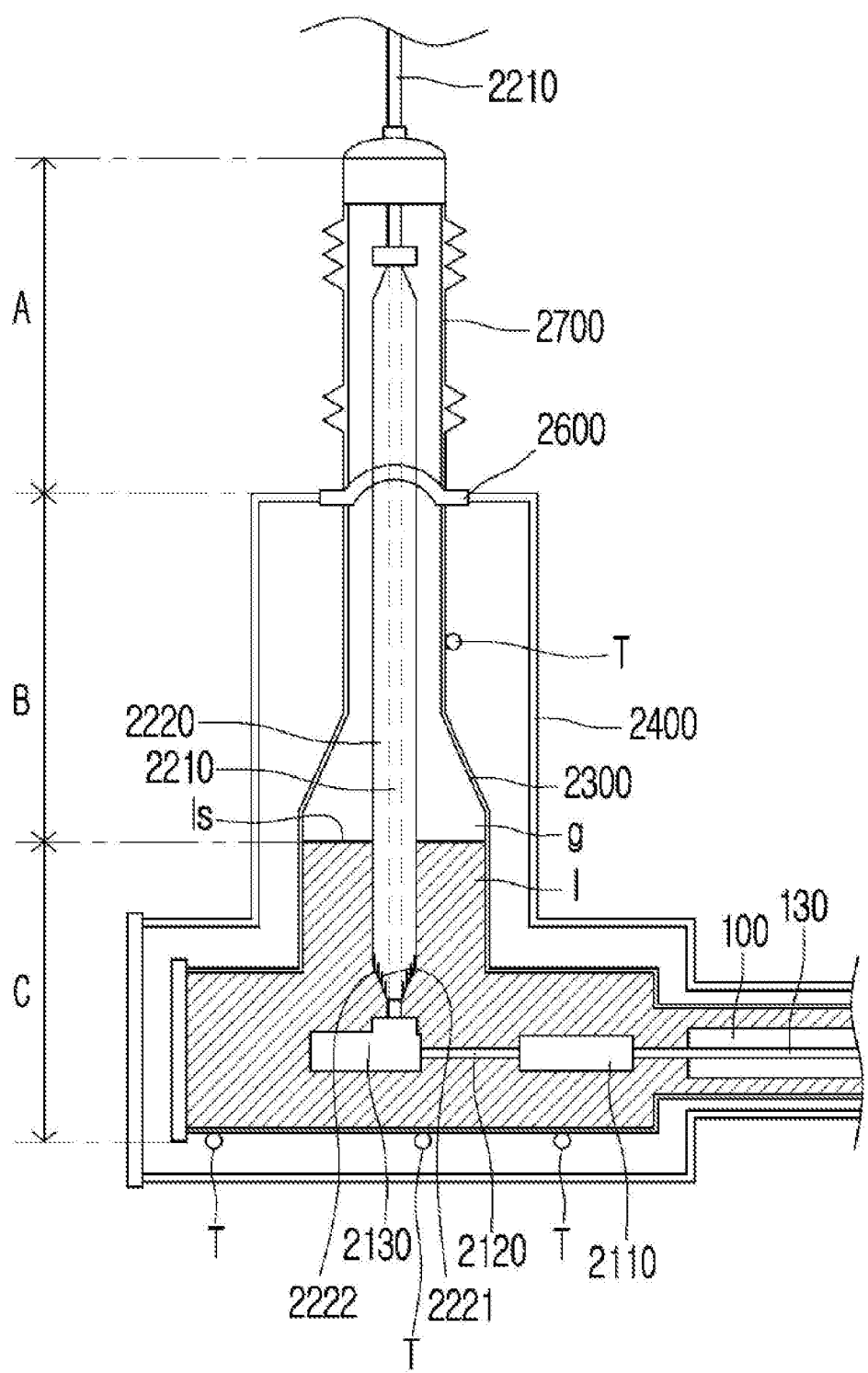
FIG. 4 is a cross-sectional view of a connecting structure for a superconducting device which is an example of a cryogenic cooling apparatus, according to the present invention.

FIG. 4 is a cross-sectional view of a connecting structure for a superconducting device which is an example of a cryogenic cooling apparatus, according to the present invention.

A connecting structure 2000 for a superconducting device may be a termination structure connecting a superconducting cable and a room-temperature cable or an intermediate connecting structure connecting superconducting cables. Both the termination structure and the intermediate connecting structure may function as a cryogenic cooling apparatus including a cooling part and a vacuum insulation part to cool a core of a superconducting cable to be cooled.

Figure 5:
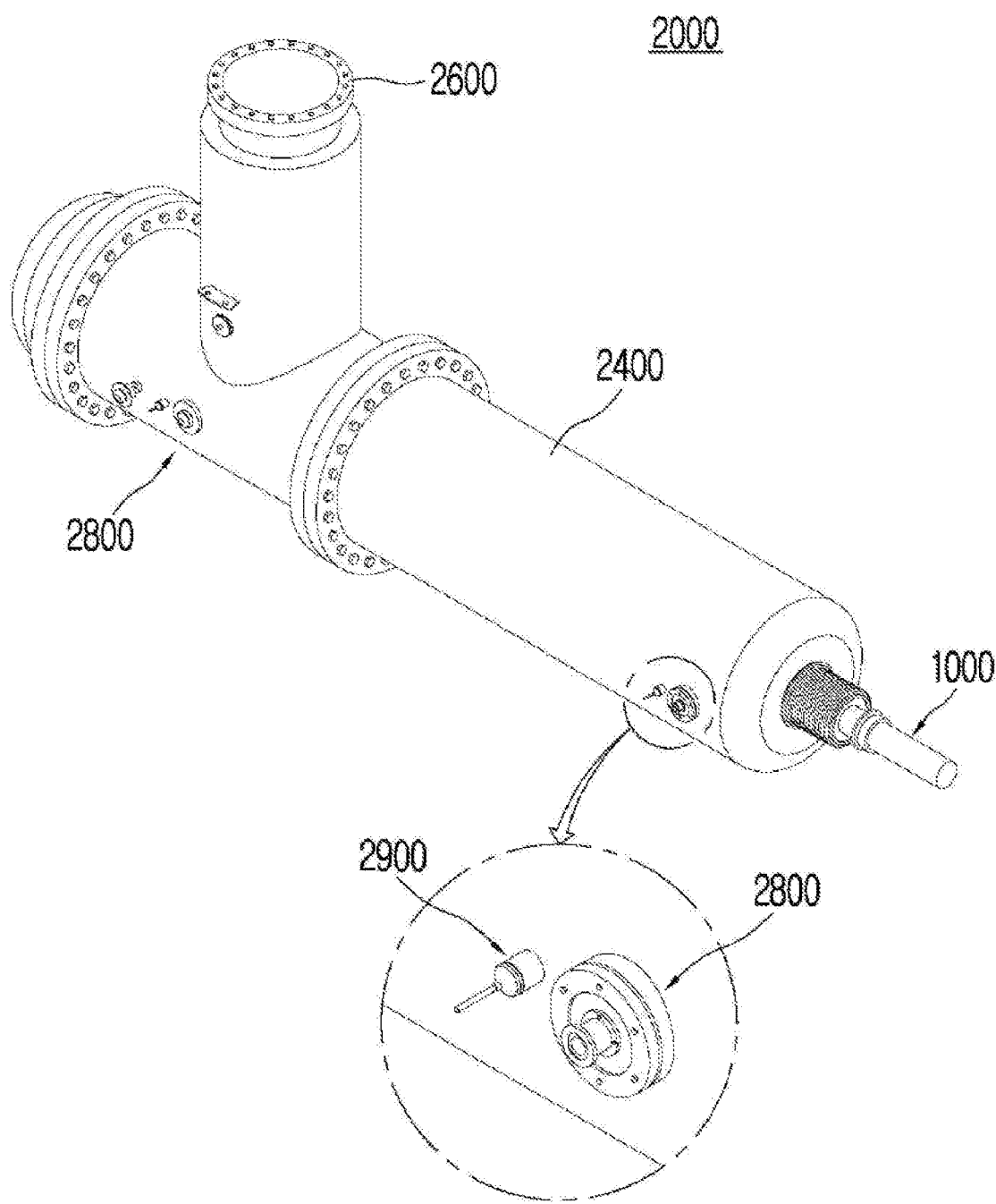
FIG. 5 is a perspective view of a connecting structure for a superconducting device which is an example of a cryogenic cooling apparatus, according to the present invention.
Figure 6:
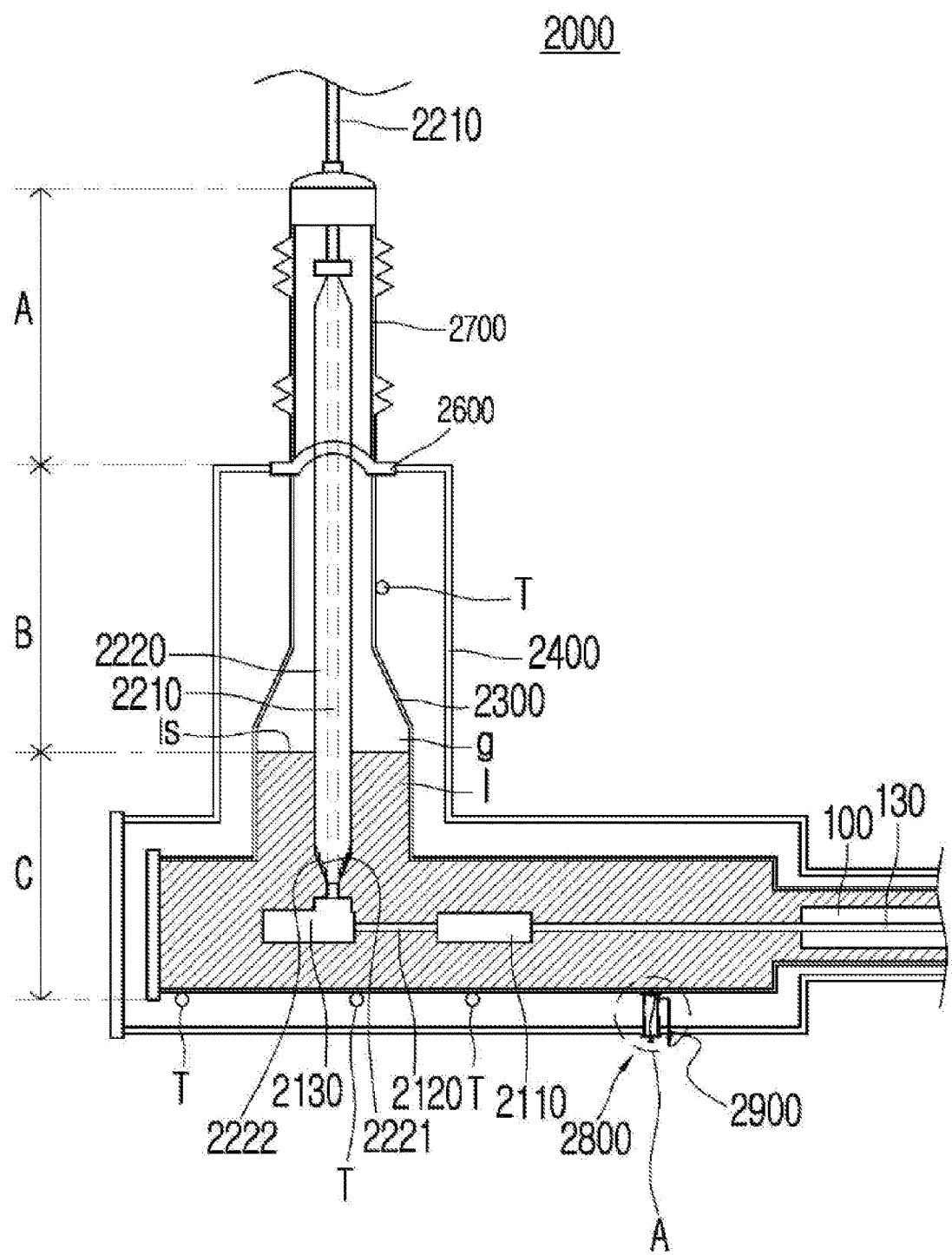
FIG. 6 is a cross-sectional view of FIG. 5.

The connecting structure 2000 for a superconducting device illustrated in FIGS. 4 to 6 are examples of a termination structure which connects a superconducting cable and a room-temperature cable, and will be described as an example of a cooling apparatus for cryogenic cooling herein.

The connecting structure 2000 for a superconducting device according to the present invention may include a cryogenic part C coupled to the superconducting cable 1000 and configured to contain a liquid refrigerant 1 into which a lower part of a conductor wire 2210 having a bushing at an outer side thereof is dipped; a temperature gradient part B which is configured to communicate with the cryogenic part C and contain a gaseous refrigerant g to have a temperature gradient, and in which the conductor wire 2210 extends upward; and a room-temperature part A which is separated from the temperature gradient part B and to which the conductor wire 2210 extending from the cryogenic part C and the temperature gradient part B is pulled out.

The connecting structure 2000 for a superconducting device may be divided into the cryogenic part C in which the conductor wire 2210 connected to the superconductor cable 1000 of the superconducting device is dipped into an extremely low-temperature liquid refrigerant; the temperature gradient part B in which the conductor wire 2210 is placed in a gaseous refrigerant contained to have a certain temperature gradient as the height of the liquid refrigerant contained in the cryogenic part C increases from a liquid surface ls; and the room-temperature part A which is separated from the temperature gradient part B and in which insulating oil or an insulating gas is contained and the conductor wire 2210 is pulled out in a room-temperature environment.

The cryogenic part C containing the extremely low-temperature liquid refrigerant and the temperature gradient part B containing the gaseous refrigerant communicate with each other. Thus, the height of the liquid surface ls of the liquid refrigerant contained in the cryogenic part C may increase or decrease according to the temperature of the liquid refrigerant and internal pressure thereof.

The cryogenic part C and the temperature gradient part B may be understood as regions of a refrigerant container 2300 containing the liquid refrigerant which are divided according to the position of the liquid surface ls.

The conductor wire 2210 is connected to the superconducting conductor layer 130 of the core part 100 of the superconducting cable 1000. Here, the connection of the conductor wire 2210 to the superconducting conductor layer 130 may be understood to mean that the conductor wire 2210 is directly connected to the superconducting conductor layer 130 via a connection means such as a connector, a joint, or another connection part and that the conductor wire 2210 is indirectly connected to the superconducting conductor layer 130 via a connection conductor to be described below or the like.

In the cryogenic part C, an end part of the superconducting conductor layer 130 of the core part 100 of superconducting cable 1000 and a connection connector 2120 are connected via a connection part 2110, and the connection connector 2120 coupled to the connection part 2110 may be electrically connected to the conductor wire 2210 via a joint 2130 or the like. Although not shown in FIG. 4, an insulation support maybe provided in the vicinity of the connection part 2110 to eliminate stress which may generated due to thermal contraction.

The joint 2130 may provide a structure stably connecting the connection connector 2120 to the conductor wire 2210 even when the connection connector 2120 contracts or tensile stress is applied thereto in a horizontal direction according to temperature. For example, the joint 2130 may include a braided wire connection member formed of a flexible material.

The conductor wire 2210 coupled to the joint 2130 extends in a direction of the top of the refrigerant container 2300. The conductor wire 2210 may be formed of a material such as copper (Cu) or aluminum (Al), and a bushing 2220 may be provided at an outer side of the conductor wire 2210. Alternatively, the conductor wire 2210 may be provided in the form of a bare conductor without the bushing 2220. Copper (Cu) or aluminum (Al) is an example of a conductive material having a low electric resistance value even at a temperature near the temperature of a refrigerant used for the superconducting cable 1000, e.g., the temperature of liquid nitrogen when the liquid nitrogen is used as the refrigerant.

The bushing 2220 may be a stainless steel conduit, the outer side of which is covered with an insulating material such as ethylene propylene rubber or reinforced fiber plastic (FRP). The bushing 2220 may include a thin electrode 2221 on inclined surfaces of an upper part and a lower part 2222 in a lengthwise direction of an outer circumference thereof. The parts of the bushing 2220 including the thin electrode 2221 may have a tapered shape. The thin electrode 221 of the bushing 2220 may be employed as an electric-field relieving means.

The liquid refrigerant 1 contained in the cryogenic part C and the gaseous refrigerant g contained in the temperature gradient part B may be stored in the refrigerant container 2300 configured to contain a refrigerant. The refrigerant container 2300 may be formed of a metal having high strength such as stainless steel.

The refrigerant container 2300 may be understood to include in a lower part thereof the cryogenic part C in which the liquid refrigerant is contained, and the temperature gradient part B which is located on the cryogenic part C and in which the gaseous refrigerant g is contained to have a temperature gradient. The refrigerant container 2300 may have a structure in which the liquid refrigerant 1 is contained in the lower part, the gaseous refrigerant g is contained above the liquid refrigerant 1, and a lower part of the conductor wire 2210 is dipped. The height of the liquid surface is of the liquid refrigerant 1 contained in the lower part of the refrigerant container 2300 may increase or decrease according to the internal temperature or pressure of the refrigerant container 2300. The gaseous refrigerant g may be gaseous nitrogen when the liquid refrigerant is liquid nitrogen.

The refrigerant container 2300 may be connected to the cooling part 200 of the superconducting cable 1000 described above, and thus the liquid refrigerant contained in the refrigerant container 2300 may circulate through the cooling part 200.

The connecting structure 2000 for a superconducting device according to the present invention may include a sealing member 2600 for sealing the temperature gradient part B to separate the temperature gradient part B from the room-temperature part A.

An upper part of the refrigerant container 2300 may be open. The sealing member 2600 for sealing the refrigerant container 2300 may be formed of a material such as epoxy which is plastic with high weather resistance and high corrosion resistance.

The room-temperature part A may be provided on the temperature gradient part B with the sealing member 2600 as a boundary.

In the room-temperature part A, the conductor wire 2210 may extend, and a room-temperature part tubular body 2700 covering the conductor wire 2210 and containing insulating oil or an insulating gas (air, SF6 gas, or the like) therein may be provided. The room-temperature part tubular body 2700 may have a porcelain tube shape.

The conductor wire 2210 passing the room-temperature part A may be pulled out to the outside while minimizing shocks caused by a temperature change.

A vacuum container 2400 covering the refrigerant container 2300 may be provided to vacuum insulate the refrigerant container 2300. The vacuum container 2400 may be configured to communicate with the vacuum insulation part 500 of the superconducting cable 1000 and to cover the refrigerant container 2300. Referring to FIG. 4, the vacuum container 2400 may extend to the upper part of the refrigerant container 2300 to vacuum insulate the refrigerant.

The connecting structure 2000 for a superconducting device may further include a sensor installed on the cryogenic part C or the temperature gradient part B to sense temperature of the cryogenic part C or the temperature gradient part B. The sensor may be a temperature sensor T.

The temperature sensor T may be provided on an outer wall of the refrigerant container 2300 to measure temperature of the refrigerant container 2300 or temperature of a refrigerant contained in the refrigerant container 2300. The temperature sensor T may be attached to the outer wall of the refrigerant container 2300 to measure surface temperature of the refrigerant container 2300 or directly measure a liquid refrigerant or a gaseous refrigerant contained in the refrigerant container 2300. A case in which the temperature sensor T is provided on the outer wall of the refrigerant container 2300 to measure the surface temperature of the refrigerant container 2300 is illustrated in the embodiment of FIG. 4.

When the temperature sensor T malfunctions or the life thereof ends, it is indispensable to release a vacuum state between the refrigerant container 2300 and the vacuum container 2400 to repair or exchange the temperature sensor T. However, the vacuum container 2400 of the connecting structure 2000 and the vacuum insulation part 500 of the superconducting cable 1000 communicate with each other to form one vacuum system as described above. Thus, the releasing of the vacuum state to repair or exchange the temperature sensor T should be understood to mean that a vacuum state of a whole system including the termination structure and the superconducting cable 1000 is released. For maintenance of the temperature sensor T, the vacuum state of the whole system including the termination structure and the superconducting cable 1000 should be released and a large amount of time and high costs are thus needed. In particular, after the maintenance of the temperature sensor T, a remarkably large amount of time is required to install the temperature sensor T again and make the whole system including the termination structure and the superconducting cable 1000 to be in the vacuum state, thereby greatly decreasing workability.

Thus, a termination structure for more quickly and easily completing a work without releasing the vacuum state of the whole system including the termination structure and the superconducting cable 1000 when the temperature sensor T is separated for maintenance thereof will be described below.

FIG. 5 is a perspective view of a connecting structure for a superconducting device which is an example of a cryogenic cooling apparatus, according to the present invention. FIG. 6 is a cross-sectional view of FIG. 5.

A termination structure 2000 according to the present invention is different from that of the embodiment of FIG. 4 described above, in that a sensor 2820 (see FIG. 7) is detachably provided, a sensor port 2800 is provided on a refrigerant container 2300 while passing through a vacuum container 2400, and a purge port 2900 is provided to supply an inert gas into or apply sound pressure into the sensor port 2800. The termination structure 2000 will be described focusing on the differences below.

Referring to FIGS. 5 and 6, the termination structure 2000 includes the sensor port 2800 and the purge port 2900 which protrude to the outside of the vacuum container 2400, when compared to the termination structure according to the previous embodiment.

In the refrigerant container 2300, the sensor port 2800 passes through the vacuum container 2400. At least two sensor ports 2800 may be detachably provided to sense temperature of the refrigerant container 2300 or temperature of a refrigerant contained in the refrigerant container 2300. The purge port 2900 may be provided on an outer wall of the vacuum container 2400 to supply the inert gas into or apply sound pressure into the sensor port 2800.

The sensor port 2800 and the purge port 2900 may be each provided in the form of an assembly on which the sensor 2820 is installed. As illustrated in FIG. 5, a plurality of sensor ports 2800 and a plurality of purge ports 2900 may be provided along a surface of the vacuum container 2400. In this case, all sensors 2820 included in the termination structure 2000 may be installed on the sensor ports 2800. However, when the amount of time and costs required to assemble and manufacture the termination structure 2000 are considered, only some of the sensors 280 included in the termination structure 2000 may be installed on the sensor port 2800.

That is, some of the sensors 2820 may be installed on a surface of the refrigerant container 2300 as in the related art (as indicated by 'T'), and the other sensors 2820 may be installed using the sensor ports 2800 as in the present embodiment. In this case, when the sensors 2820 included in the termination structure 2000 need to be maintained, the sensors 2820 may be quickly and easily maintained using the sensor port 2800. Although all sensors 2820 which need to be maintained among the sensors 280 of the termination structure 2000 should be maintained, the amount of time and costs required to separate and reinstall the sensors 2820 installed according to a conventional method for maintenance remarkably increase. Thus, only the sensors 2820 installed on the sensor ports 2800 according to the present embodiment may be maintained to decrease a time period for stopping operation of the termination structure 2000 in urgent situations or the equivalent, so that the termination structure 2000 may be operated again within a short time period.

Figure 7:
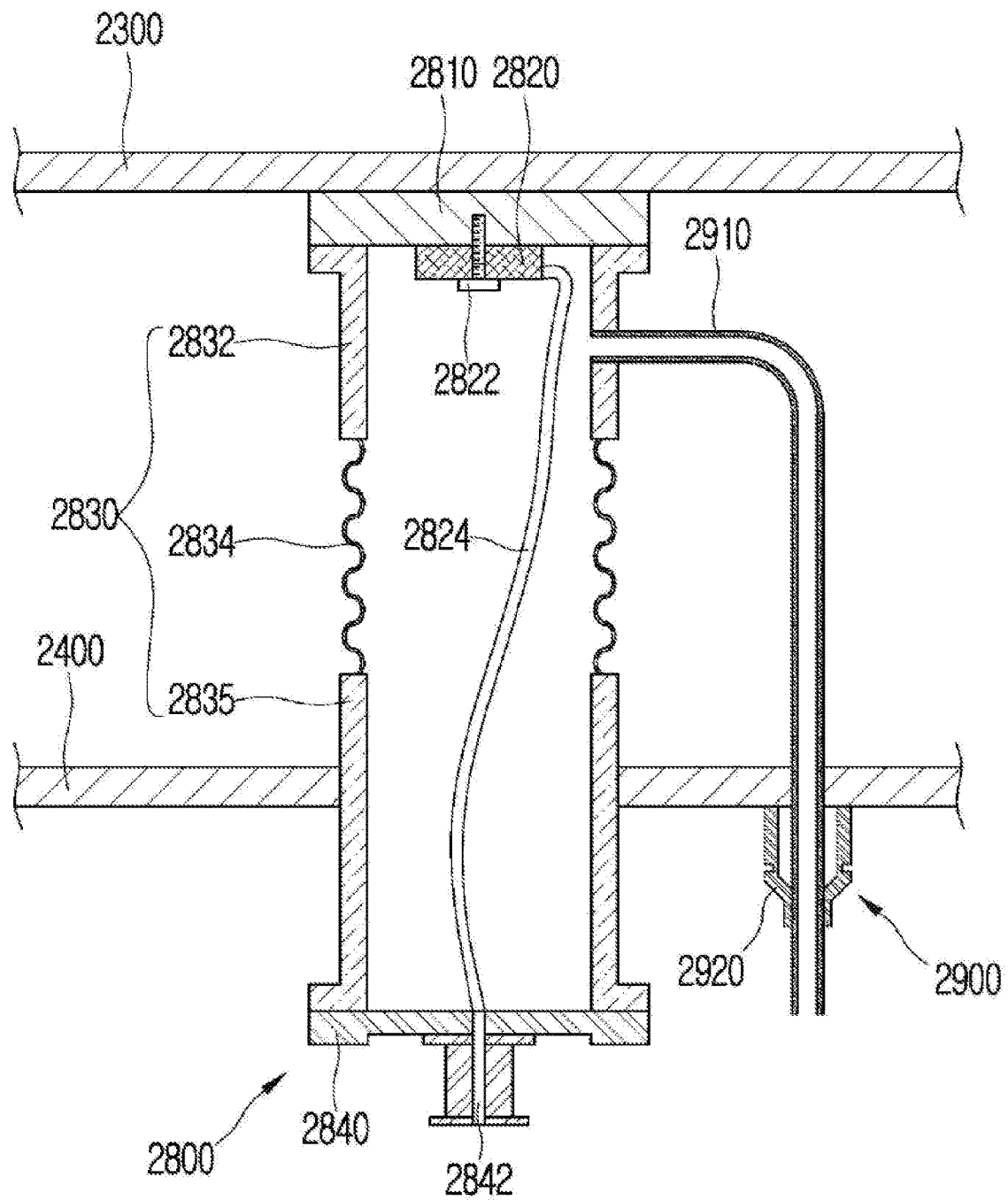
FIG. 7 is a partially expanded cross-sectional view of a region 'A' of FIG. 6.

FIG. 7 is a partially expanded cross-sectional view of a region 'A' of FIG. 6, i.e., to particularly illustrate the structures of the sensor port 2800 and the purge port 2900.

Referring to FIG. 7, the sensor port 2800 includes a pipe part 2830 extending toward the vacuum container 2400 from the refrigerant container 2300 such that one end thereof may communicate with the outside while passing through the vacuum container 2400, and a cover 2840 configured to air-tightly block one end part of the pipe part 2830.

The pipe part 2830 may separate or divide a space between the refrigerant container 2300 and the vacuum container 2400 and a space in which the sensor 2820 is installed. That is, the inside of the pipe part 2830 may be maintained in the vacuum state to serve as an insulator, and provide an additional installation space for a sensor 2820 installed therein, as will be described below. Thus, in order to separate the sensor 2820 from the inside of the pipe part 2830, the sensor 2820 may be easily and quickly separated by releasing only the vacuum state of the inside of the pipe part 2830. When the sensor 2820 is reinstalled and the inside of the pipe part 2830 is made to be in the vacuum state, an inner space of the pipe part 2830 is very smaller than a vacuum system including the termination structure 2000 and the superconducting cable 1000 and is thus made to be in the vacuum state within a relatively short time period.

The pipe part 2830 on an outer wall of the refrigerant container 2300 communicates with the outside via the vacuum container 2400 and thus heat from the outside of the vacuum container 2400 may be transferred to the refrigerant container 2300 through conduction. In this case, the superconductivity condition may be influenced by increasing temperature of the refrigerant contained in the refrigerant container 2300. Thus, a heat conduction prevention means may be provided on at least a part of the pipe part 2830 to increase a heat conduction path between the refrigerant container 2300 and the vacuum container 2400. The heat conduction prevention means may be embodied in various forms. For example, the heat conduction prevention means may include a concavo-convex part or a corrugate tube 2834 on at least a part of the pipe part 2830. FIG. 7 illustrates a case in which the heat conduction prevention means includes the corrugate tube 2834 but embodiments are not limited thereto.

In detail, the pipe part 2830 may include a first pipe part 2832 extending by a predetermined length on the outer wall of the refrigerant container 2300 toward the vacuum container 2400, the corrugate tube 2834 having a predetermined length and connected to the first pipe part 2832, and a second pipe part 2835 connected to the corrugate tube 2834 and communicating with the outside of the vacuum container 2400. In this case, the corrugate tube 2834 may be connected to the first pipe part 2832 and the second pipe part 2835, for example, by welding.

The first pipe part 2832, the corrugate tube 2834, and the second pipe part 2835 of the pipe part 2830 may be formed of a material having low heat conductivity. The first pipe part 2832 and the second pipe part 2835 may be formed of the same material or may be formed of materials having different heat conductivities to reduce heat conductivity.

In the sensor port 2800, the sensor 2820 may be directly attached to the outer wall of the refrigerant container 2300 but the mechanical strength of the outer wall of the refrigerant container 2300 may decrease in this case. Thus, in the present embodiment, an installation part 2810 on which the sensor 2820 is detachably installed is provided on at least a part of the refrigerant container 2300, and the sensor port 2800 may be provided on the installation part 2810.

The installation part 2810 may be formed to a predetermined thickness, and attached to the outer wall of the refrigerant container 2300 by welding or the like. Although not shown, the installation part 2810 maybe integrally formed with the refrigerant container 2300. In this case, a region of the outer wall of the refrigerant container 2300 on which the sensor 2820 is to be attached may be formed to be thicker than the remaining region thereof, and the sensor 2820 may be attached to the region.

When the installation part 2810 is provided, the sensor 2820 is detachably provided on the installation part 2810. The sensor 2820 may be detachably provided on the installation part 2810, for example, through a fastening member such as a bolt 2822. In this case, the sensor 2820 may be a detachable temperature sensor. Thus, the sensor 2820 may be installed on the installation part 2810 by screwing the bolt 2822 into the installation part 2810, and maybe easily separated from the installation part 2810 by unscrewing the bolt 2822 from the installation part 2810.

An open end part of the sensor port 2800 connected to the outer side of the vacuum container 2400 is air-tightly blocked by the cover 2840. The cover 2840 may be coupled to the end part of the pipe part 2830 through a fastening means such a bolt. In this case, an O-ring or the like may be provided between the cover 2840 and the end of the pipe part 2830 to air-tightly block a space between the cover 2840 and the end of the pipe part 2830.

The sensor 2820 may transmit information regarding measured temperature of the refrigerant to an external control means (not shown) or the like. In this case, the information regarding the temperature may be transmitted via a wire or wirelessly. The sensor 2820 and the external control means should be electrically connected to each other when it is determined that the information regarding the temperature is transmitted via a wire by taking into account easy assembly and manufacturing costs of the sensor 2820 during selection of the sensor 2820. In this case, a signal terminal 2842 to which a cable 2824 extending from the sensor 2820 is electrically connected may be installed on the cover 2840. That is, the signal terminal 2842 maybe installed to pass through the cover 2840, the cable 2824 extending from the sensor 2820 may be electrically connected to one end of the signal terminal 2842, and another end of the signal terminal 2842 may be electrically connected to the control means. As described above, the cover 2840 is configured to transmit temperature information of the sensor 2820 to the outside via a wire. Accordingly, any additional device is not needed to transmit the temperature information and thus the structure of the sensor port 2800 may be simplified. Furthermore, the amount of time and costs required to assemble and install the sensor port 2800 may be decreased.

In order to separate the sensor 2820 from the sensor port 2800, the cover 2840 is separated, a vacuum state of the inside of the sensor port 2800 is released, and then the sensor 2820 is separated. However, while the termination structure 2000 is operated, the inside of the sensor port 2800 is maintained in the vacuum state for vacuum insulation. Thus, when the cover 2840 is separated, external air flows into the sensor port 2800 within a very short time. In this case, the external air and moisture contained therein may flow into the sensor port 2800. Thus, when the cover 2840 is separated, the inside of the sensor port 2800 may be frosted over due to the moisture or the like. In this case, it is difficult to separate the sensor 2820 from the inside of the sensor port 2800. Furthermore, when the sensor 2820 is reinstalled, malfunctions may occur. After the sensor 2820 is reinstalled, a means for applying sound pressure is needed to make the inside of the sensor port 2800 be in the vacuum state.

Thus, the termination structure 2000 according to present embodiment includes the purge port 2900 provided on the outer wall of the vacuum container 2400 together with the sensor port 2800 to supply the inert gas into or apply sound pressure into the sensor port 2800. That is, before the cover 2840 is separated, the inert gas such as nitrogen may be supplied into the sensor port 2800 via the purge port 2900 so that external air and moisture may be prevented from flowing into the sensor port 2800 even when the cover 2840 is separated. Furthermore, after the sensor 2820 is reinstalled in the sensor port 2800, the inside of the sensor port 2800 may be made to be in the vacuum state by air-tightly blocking the cover 2840 and applying sound pressure into the sensor port 2800 via the purge port 2900. The purge port 2900 will be described in detail below with reference to the drawings.

The purge port 2900 includes a port part 2920 protruding to the outside of the vacuum container 2400, and further includes a connection pipe 2910 connecting the sensor port 2800 and the port part 2920 of the purge port 2900.

For example, one end of the connection pipe 2910 may be connected to the pipe part 2830 of the sensor port 2800, and another end thereof may be connected to the port part 2920. When the inert gas is supplied into the sensor port 2800 via the connection pipe 2910, the sensor 2820 should be prevented from being frosted over due to external air flowing into the vicinity of the sensor 2820. Thus, one end of the connection pipe 2910 may be coupled to the sensor port 2800 to be adjacent to the sensor 2820. When the connection pipe 2910 is provided adjacent to the sensor 2820, the inert gas supplied via the connection pipe 2910 gradually diffuses at the sensor 2820 and thus air flowing from the outside may be prevented from approaching the sensor 2820. In detail, the connection pipe 2910 may be coupled to the sensor port 2800 to be adjacent to the refrigerant container 2300. In this case, when the pipe part 2830 includes the first pipe part 2832, the corrugate tube 2834, and the second pipe part 2835 as described above, one end of the connection pipe 2910 may be connected to the first pipe part 2832.

When the vacuum state of the inside of the sensor port 2800 is released by separating the cover 2840, the inert gas is supplied into the sensor port 2800 through the connection pipe 2910 of the purge port 2900. When the inside of the sensor port 2800 is formed to be in the vacuum state after the sensor 2820 is installed, sound pressure is applied into the sensor port 2800 through the connection pipe 2910 of the purge port 2900. Thus, since an inert-gas supply part or a pumping means applying sound pressure may be selectively connected to an end of the connection pipe 2910, a valve (not shown) may be provided on a position on the connection pipe 2910 outside the vacuum container 2400 to selectively block the connection pipe 2910.

In the connecting structure 2000 having the above structure for a superconducting device, a method of separating/installing the sensor 2820 for maintenance of the sensor 2820 will be described below.

First, in order to separate the sensor 2820 installed in the termination structure 2000 for maintenance, an inert gas is supplied into the sensor port 2800 via the purge port 2900. In detail, the connection pipe 2910 of the purge port 2900 is connected to an inert-gas source, and the inert gas is supplied into the sensor port 2800 at a predetermined pressure via the connection pipe 2910.

Next, the vacuum state of the sensor port 2800 is released by separating the cover 2840 of the sensor port 2800. In this case, since the inside of the sensor port 2800 has been filled with the inert gas, external air and moisture may be prevented from flowing into the sensor port 2800 even when the cover 2840 is separated.

The sensor 2820 is separated from the inside of the sensor port 2800 after the cover 2840 is separated, and is installed inside the sensor port 2800 after maintenance of the sensor 2820.

After the installation of the sensor 2820, the inside of the sensor port 2800 is vacuumized by applying sound pressure into the sensor port 2800 through the purge port 2900. In detail, the sound pressure is applied into the sensor port 2800 through the connection pipe 2910 by coupling the connection pipe 2910 of the purge port 2900 to the pumping means and driving the pumping means.

While exemplary embodiments of the present invention have been described above, it will be understood by those of ordinary skill in the art that various changes in form and details may be made therein without departing from the spirit and scope of the invention as defined by the appended claims. Thus, when modified embodiments include elements as set forth in the claims of the present invention, they should be construed as being included in the scope of the present invention.

The invention claimed is:

1. A cryogenic cooling apparatus comprising:
a cooling part configured to cool an object to be cooled, the cooling part provided outside the object, and including a refrigerant container for containing a circulating liquid refrigerant;
a vacuum insulation part provided on an outer side of the cooling part, and including a vacuumized vacuum container to vacuum insulate the cooling part;
a sensor provided on a surface of the refrigerant container of the cooling part;
a sensor port extending to the surface of the refrigerant container having the sensor while passing through the vacuum container, the sensor port being shielded from the vacuum insulation part; and
a purge port configured to supply an inert gas into the sensor port or apply sound pressure into the sensor port, the purge port being provided outside the vacuum container.

2. The cryogenic cooling apparatus of claim 1, wherein the sensor is detachably installed on the refrigerant container, and
the sensor port comprises:
a pipe part extending from the refrigerant container toward the vacuum container, and having one end configured to communicate with the outside while passing through the vacuum container; and
a cover configured to air-tightly block one end part of the pipe part.

3. The cryogenic cooling apparatus of claim 2, wherein the sensor is detachably fastened into an installation part, the installation part being installed on the surface of the refrigerant container.

4. The cryogenic cooling apparatus of claim 2, wherein at least one section of the pipe part has a corrugate tube structure.

5. The cryogenic cooling apparatus of claim 1, further comprising a connection pipe configured to connect the sensor port and the purge port, the connection pipe being coupled to the sensor port at a position closer to the refrigerant container than the vacuum container to communicate with the sensor port.

6. The cryogenic cooling apparatus of claim 5, wherein the purge port comprises a valve configured to selectively block the connection pipe.

7. The cryogenic cooling apparatus of claim 5, wherein, when a vacuum state of an inside of the sensor port is released, the inert gas is supplied into the sensor port via the purge port.

8. The cryogenic cooling apparatus of claim 5, wherein, when an inside of the sensor port is formed in a vacuum state, the sound pressure is applied into the sensor port via the purge port.

9. The cryogenic cooling apparatus of claim 1, wherein the vacuum insulation part is divided into a plurality of parts,
wherein the sensor is provided in each of the plurality of parts of the vacuum insulation part.

10. The cryogenic cooling apparatus of claim 9, wherein the sensor port and the purge port coupled to the sensor port are provided in each of the plurality of parts of the vacuum insulation part,
wherein the sensor is installed at a side of the refrigerant container inside the sensor port provided in each of the plurality of parts of the vacuum insulation part.

11. A connecting structure for a superconducting device, comprising:
a refrigerant container having an open upper part, the refrigerant container including at a lower part thereof a cryogenic part configured to contain a liquid refrigerant, and a temperature gradient part provided above the cryogenic part and configured to contain a gaseous refrigerant, wherein the gaseous refrigerant has a temperature gradient;
a vacuum container configured to cover the refrigerant container so as to vacuum insulate the refrigerant container;
a sensor port provided on the refrigerant container while passing through the vacuum container, the sensor port including at least one sensor detachably provided to sense temperature of the refrigerant container or temperature of the liquid refrigerant or the gaseous refrigerant contained in the refrigerant container;
a purge port configured to supply an inert gas into the sensor port or apply sound pressure into the sensor port, the purge port being provided on an outer wall of the vacuum container;
a room-temperature part tubular body configured to contain insulating oil or an insulating gas, the room-temperature part tubular body forming a room-temperature part and being separated from the refrigerant container;

a sealing member configured to seal the open upper part of the refrigerant container to separate the temperature gradient part from the room-temperature part; and a conductor wire coupled to a superconducting conductor layer of a superconducting cable in the liquid refrigerant contained in the refrigerant container, the conductor wire extending to the room-temperature part tubular body while passing through the sealing member.

12. The connecting structure of claim 11, wherein an installation part is provided on at least a part of the refrigerant container, wherein the at least one sensor is detachably installed in the installation part.

13. The connecting structure of claim 11, wherein the sensor port comprises:
   a pipe part extending from the refrigerant container toward the vacuum container, and having one end configured to communicate with the outside while passing through the vacuum container; and
   a cover configured to air-tightly block one end part of the pipe part.

14. The connecting structure of claim 13, wherein the pipe member comprises a heat conduction prevention means on at least a part thereof, the heat conduction prevention means being configured to increase a heat conduction path between the refrigerant container and the vacuum container.

15. The connecting structure of claim 14, wherein the heat conduction prevention means comprises a convex-concavo part or a corrugate tube provided on the at least the part of the pipe part.

16. The connecting structure of claim 13, wherein a signal terminal is installed at the cover, the signal terminal being electrically connected to a cable extending from the at least one sensor.

17. The connecting structure of claim 11, further comprising a connection pipe configured to connect the sensor port and the purge port.

18. The connecting structure of claim 17, wherein the connection pipe is coupled to the sensor port to be adjacent to the refrigerant container.

19. The connecting structure of claim 17, further comprising a valve configured to selectively block the connection pipe, the valve being provided at a predetermined position on the connection pipe outside the vacuum container.

20. The connecting structure of claim 19, wherein the inert gas is supplied into the sensor port through the purge port and the connection pipe when a vacuum state of an inside of the sensor port is released, and the sound pressure is applied into the sensor port through the purge port when the inside of the sensor port is formed in the vacuum state.

* * * * *